United States Patent
Amemiya

(10) Patent No.: US 7,616,394 B2
(45) Date of Patent: Nov. 10, 2009

(54) STORAGE APPARATUS, CONTROL METHOD AND CONTROL APPARATUS

(75) Inventor: Yoshihiro Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 575 days.

(21) Appl. No.: 11/455,479

(22) Filed: Jun. 19, 2006

(65) Prior Publication Data
US 2007/0223124 A1 Sep. 27, 2007

(30) Foreign Application Priority Data
Mar. 24, 2006 (JP) .............................. 2006-083186

(51) Int. Cl.
*G11B 27/36* (2006.01)
(52) U.S. Cl. .......................................... 360/31; 360/60
(58) Field of Classification Search ........................ None
See application file for complete search history.

(56) References Cited
U.S. PATENT DOCUMENTS
5,550,925 A * 8/1996 Hori et al. ..................... 381/98

2002/0191314 A1 * 12/2002 Ottesen et al. ................ 360/31

FOREIGN PATENT DOCUMENTS
| JP | 04-001976 | 1/1992 |
| JP | 11-306698 | 11/1999 |
| JP | 2001-344705 | 12/2001 |

* cited by examiner

*Primary Examiner*—Jason C Olson
(74) *Attorney, Agent, or Firm*—Greer, Burns & Crain, Ltd.

(57) ABSTRACT

The heads have write head elements which record data onto a disk medium capable of coping with perpendicular magnetic recording and read head elements which reproduce data. The monitored band detecting unit sets a frequency band in a range from the signal band of the write data signal to the error rate worsening band on a lower level in which the error rate worsens as a monitored band, and detects a signal in the monitored band from among write data entered into the write amplifier. The determining unit discontinues the recording operation of the write amplifier upon determination that a detection signal of the monitored band detected by the monitored band detecting unit is larger than a prescribed threshold value and outputs a determination signal from the fault terminal to generate a fault event.

17 Claims, 8 Drawing Sheets

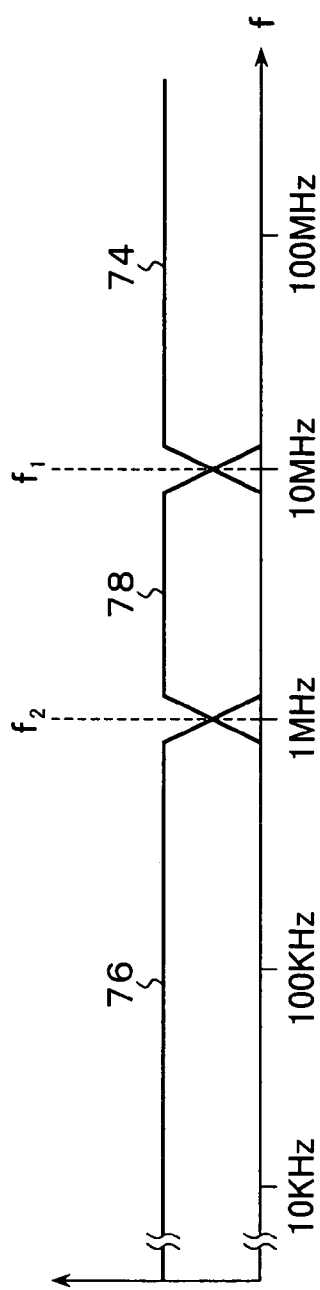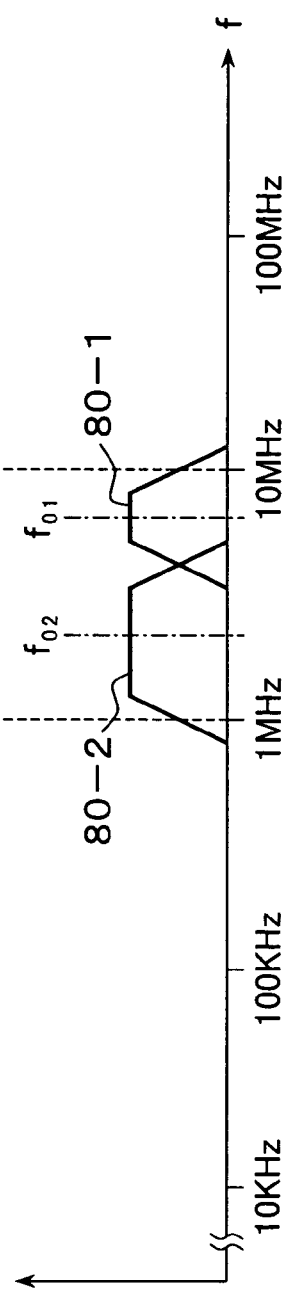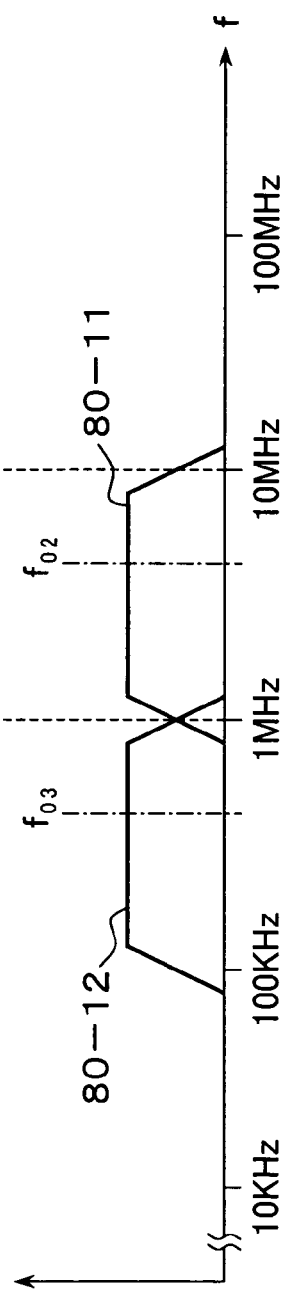
FIG. 7A
FIG. 7B
FIG. 7C

STORAGE APPARATUS, CONTROL METHOD AND CONTROL APPARATUS

This application claims priority based on prior application No. JP 2006-08186 filed Mar. 24, 2006, in Japan.

BACKGROUND OF THE INVENTION

1. Field of the Invention

The present invention relates to a storage apparatus which records and reproduces data on or from a magnetic disk medium by the perpendicular magnetic recording process and a control method thereof, particularly, to a storage apparatus which monitors a signal frequency band of write data at a head IC and detects an abnormality and a control method thereof.

2. Description of the Related Art

A conventional magnetic disk apparatus is based on the longitudinal magnetic recording process, in which a signal is recorded by magnetizing a magnetic layer in a direction in parallel with the surface of a magnetic disk medium. This results in magnetic poles facing each other at bit boundaries at a high recording density, thus leading to instability.

For the purpose of solving this problem, a magnetic disk apparatus based on the perpendicular magnetic recording process has recently been industrialized. The perpendicular magnetic recording process is to record signals by magnetizing a magnetic layer in a direction perpendicular to the surface of a magnetic disk medium. It brings about stabilization at high densities since magnetic poles attracting each other face each other at bit boundaries, and permits high-density recording of over 100 giga bits/in$^2$.

In perpendicular magnetic recording, however, presence of a wide DC signal recording area in the magnetic disk medium, if any, causes occurrence of a strong leaking magnetic field on the medium. When reading out a magnetic disk medium having data recorded by the perpendicular magnetic recording process via a read head element such as a GMR element, the symmetric amplitude converting property of the read signal relative to the recording magnetic field becomes asymmetric under the effect of the leaking magnetic flux. This may cause degradation of the read signal and worsening of the error rate.

In a magnetic disk apparatus based on perpendicular magnetic recording, therefore, write data entered into a write amplifier of the head IC through run length conversion fall within a sufficiently high write data signal band so as not to contain a low-frequency signal component which may cause worsening of the error rate. As a result, even when perpendicular recording is made onto a magnetic disk medium, the DC signal recording area does not spread.

In such a conventional magnetic disk apparatus based on the perpendicular magnetic recording process, however, write data entered into the write amplifier of the head IC by the signal method of the read channel is converted so as not to contain a low-frequency signal component. The head IC, mounted on an arm of the head actuator driven by the voice coil motor, is wired with a flexible printed circuit (FPC) with the read channel on the circuit board. Since it is always deformed by the action of the arm, the line impedance varies, depending upon the state of deformation, leading to dull signal waveform, and this may cause an increase in low-frequency signal component of the write data.

The increase in low-frequency component caused by the signal waveform becoming dull of the write data causes an increase in the DC signal recording area of the magnetic disk medium, resulting in an increase of leaking magnetic fluxes. As a result, the symmetric amplitude conversion property of the read signal relative to the recording magnetic field becomes asymmetric under the effect of the leaking magnetic fluxes, and a problem intrinsic to perpendicular magnetic recording is encountered here in that deterioration of the read signal leads to worsening of the error rate.

SUMMARY OF THE INVENTION

According to the present invention, there are provided a storage apparatus in which worsening of error rate is prevented by avoiding recording action based on perpendicular magnetic recording in a state in which low-frequency signal component of write data has increased under the effect of mechanical deformation of wiring of the head IC, and a control method thereof.

(Storage Apparatus)

The present invention provides a storage apparatus based on the perpendicular magnetic recording process. The storage apparatus of the present invention comprises:

a write head element which records data onto a disk medium capable of coping with perpendicular magnetic recording and a read head element which reproduces data;

a write amplifier which outputs write data signals to the write head element;

a monitored band detecting unit which sets a frequency band between a signal band of the write data signals and a error rate worsening band on a lower level in which the error rate worsens as a monitored band, and detects signals falling within this monitored band from among write data signals entered into the write amplifier; and a determining unit which determines whether or not a signal detected in the monitored band by the monitored band detecting unit is larger than a prescribed threshold value and outputs a determination signal.

In this storage apparatus, the monitored band set by the monitored band detecting circuit is a band covering a range from a lower limit frequency of the write data signal band to the upper limit frequency of the error rate worsening band which is lower than the lower limit of the write data signal band.

The monitored band detecting circuit has a band pass filter; an arbitrary frequency within the monitored band is set as a center frequency of the band pass filter; and the bandwidth of the center frequency is set at a bandwidth not exceeding the monitored band.

The monitored band detecting circuit has a band pass filter; a frequency at about the center of the monitored band is set as a center frequency of the band pass filter; and the bandwidth for the center frequency is set within ½ the bandwidth of the monitored band.

The determining unit discontinues recording operation of the write amplifier by output of a determination signal, and at the same time, causes generation of a fault event by outputting the determination signal to outside.

The monitored band detecting unit detects, by dividing the monitored band into a high-region monitored band and a low-region monitored band, a signal of each monitored band; and the determining unit causes, upon determining that the detection signal of the high-region monitored band is larger than a prescribed threshold value, generation of a fault event by outputting a first determination signal to outside, and when the determination signal of the low-region monitored band is determined to be larger than a prescribed threshold value, discontinues recording operation of the write amplifier by outputting a second determination signal.

The storage apparatus of the present invention further comprises a worsening band monitoring unit which detects a signal of the error rate worsening band; and the determining unit causes, upon determining that the detection signal of the monitored band is larger than a prescribed threshold value, generation of a fault event by outputting a first determination signal to outside, and when the determination signal of the error rate worsening band is determined to be larger than a prescribed threshold value, discontinues recording operation of the write amplifier by outputting a second determination signal.

In the storage apparatus of the present invention, the write amplifier, monitored band detecting unit and determining unit form an integrated circuit integrated together with a read amplifier which preliminarily amplifies and outputs a signal read out from the read head, and the integrated circuit has at least an input/output terminal of the write amplifier, an input/output terminal of the read amplifier, and a determination signal output terminal of the determining unit.

The present invention provides a control method of a storage apparatus which comprises:

a head having a write head element recording data onto a disk medium capable of coping with perpendicular magnetic recording and a read head reproducing data;

a write amplifier outputting a write data signal to the write head element; and a write amplifier outputting a write data signal to the write head element;

the control method comprising:

a monitored band detecting step of setting a frequency band between a signal band of the write data signal and an error rate worsening band on a lower level in which the error rate worsens for the monitored band, and detecting a signal in the monitored band in the write data signals entered into the write amplifier; and a determining step of determining that a detection signal of the monitored band by the monitored band detecting step is larger than a prescribed threshold value and outputting a determination signal.

The present invention provides a control apparatus serving as a head IC, comprising:

a write amplifier which outputs a write data signal to a write head element;

a monitored band detecting unit which sets a frequency band between the signal band of the write data signal and a frequency band of an error rate worsening band lower than the above in which the error rate worsens as a monitored band, and detects a signal of the monitored band from among write data signal entered into the write amplifier; and a determining unit which determines that a detection signal of a monitored band by the monitored band detecting unit and outputs a determination signal.

According to the present invention, for a signal band of write data entered into the write amplifier which perpendicularly magnetic-records data onto a disk medium by a write head element, a monitored band is set between a write data band and a lower error rate worsening band. When a detected signal of the monitored band becomes larger than a prescribed threshold value, low-frequency signal component of the write data is determined to have increased, and the recording operation is discontinued. Writing of the write data containing a low-frequency signal component which may cause deterioration of error rate onto the medium is avoided, thus making it possible to inhibit decrease in the error rate and achieve stable high-density recording and reproduction.

As in a storage apparatus of the longitudinal magnetic recording type, it is necessary to incorporate a circuit for detecting and determining a signal of a monitored band set in the write data into the integrated head IC mounted on the arm. A write data low detecting circuit which detects a low-frequency band signal for an abnormality of write data and outputs a fault signal is mounted on the head IC of the longitudinal magnetic recording type. This circuit suffices to be replaced by a circuit for detecting and determining a signal of the monitored band intrinsic to perpendicular magnetic recording of the present invention. A head IC capable of coping with perpendicular magnetic recording with the same chip area as a conventional head IC as it is can thus easily be achieved.

More specifically, only a band pass filter extracting signal components of the monitored band for the write data and a comparator for determining an output thereof are required. This is a circuit substantially equivalent to the write data low detecting circuit provided on the head IC of the longitudinal magnetic recording type in the conventional art with the only difference of the frequency band. It is therefore possible to easily achieve a head IC well coping with perpendicular magnetic recording equivalent to the conventional head IC.

When recording operation is discontinued as a result of detection of an abnormality in the monitored band on a head IC side, a determination signal is outputted to outside as a fault signal. This makes it possible to recognize the discontinuance of the recording operation in the head IC for the hard disk controller or the read channel as a fault event, and thus to carry out a recovery operation such as rewrite after waiting for resolution of the fault event.

By monitoring changes of the signal band of write data in the form of a monitored band or dividing it into two-staged bands including a monitored band and an error rate worsening band which are high-region and low-region bands, respectively, generating a fault event and issuing an alarm when detecting an abnormality on the high-region side, and discontinuing the recording operation upon detection of an abnormality on the low-region side, it is possible to prevent a decrease in the error rate resulting from an increase of low-frequency components of the write data more reliably.

The above and other objects, features, and advantages of the present invention will become more apparent from the following detailed description with reference to the drawings.

BRIEF DESCRIPTION OF THE DRAWINGS

FIGS. 7A to 7C are descriptive views of the write data signal band, error rate band, monitored band and filter extraction band in the head IC circuit shown in FIG. 6.

DETAILED DESCRIPTION OF THE PREFERRED EMBODIMENTS

Figure 1:
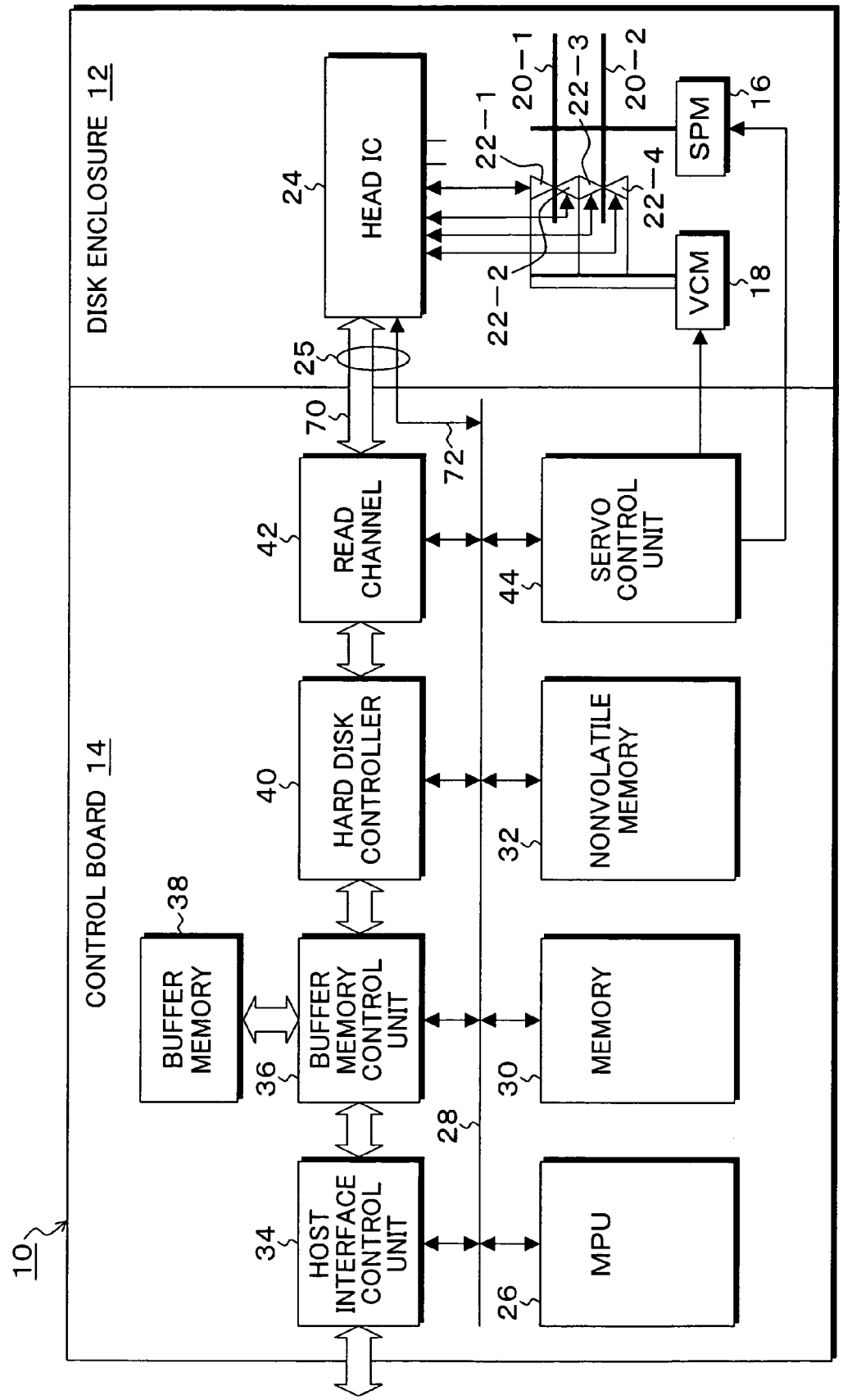
FIG. 1 is a block diagram of the magnetic disk apparatus illustrating an embodiment of the storage apparatus of the present invention.

FIG. 1 is a block diagram of a magnetic disk apparatus based on the perpendicular magnetic recording process to which the present invention is applied. In FIG. 1, the magnetic disk apparatus 10 known as a hard disk drive HDD comprises a disk enclosure 12 and a control board 14. A spindle motor 16 is provided in the disk enclosure 12. Magnetic disk media 20-1 and 20-2 having a medium construction performing perpendicular magnetic recording are attached to a rotation shaft of the spindle motor 16 which is rotated at constant revolutions such as 4,200 rpm. A voice coil motor 18 is provided on the disk enclosure 12. The voice coil motor 18 mounts heads 22-1 to 22-4 at an arm leading end of a head actuator and conducts positioning of the heads relative to the recording faces of the magnetic disks 20-1 and 20-2. Write head elements recording data onto the magnetic disks 20-1 and 20-2 and read head elements using GMR elements or the like reproducing data from the magnetic disks 20-1 and 20-2 capable of coping with perpendicular magnetic recording are provided on the heads 22-1 to 22-4. Each of the magnetic disks 20-1 and 20-2 used for perpendicular magnetic recording has a structure in which a recording layer showing the perpendicular magnetic anisotropy, an intermediate layer and a soft under-layer (SUL) are formed in this order on the substrate. The soft under-layer arranged between the recording layer and the substrate via the intermediate layer can generate a steep and large recording magnetic field by causing part of magnetic fluxes generated from a magnetic pole of the write head element to pass through to the other magnetic pole. The heads 22-1 to 22-4 are signal-line-connected to the head IC 24. The head IC 24 is commonly known as a preamplifier. The head IC 24 selects a head in accordance with a head select signal based on the write command or the read command from the host serving as an upper-level apparatus, to perform write or read. A write amplifier is provided for the write system and a preamplifier is provided for the read system on the head IC 24. In this embodiment, the head IC 24 incorporates a function of monitoring low-region frequencies of the write data signal, and when detecting a low-region frequency which may cause worsening of the error rate, discontinuing write operation and transmitting a fault signal. An MPU 26 is provided on the control board 14, and a memory 30 storing a control program using a RAM and control data, and a non-volatile memory 32 storing a control program using FROM and the like are provided for the bus 28 of the MPU 26. An interface control unit. 34, a buffer memory control unit 36 controlling the buffer memory 38, a hard disk controller 40 serving as a formatter, a read channel 42 serving as a write modulating unit and a read modulating unit, and a servo control unit 44 controlling the spindle motor 16 and the voice coil motor 18 are provided for the bus 28 of the MPU 26. The head IC 24 of the disk enclosure 12 is mounted on the arm portion of the head actuator driven by the voice coil motor 18. The head IC 24 is connected to the read channel 42 and the bus 28 flexibly by an FPC line 25. The FPC line 25 includes a data line 70 and a control line 72. The FPC line 25 is deformed by driving of the arm by the voice coil motor 18. Along with this deformation, there is a change in impedance of the data line 70, so that the signal waveform of the write data entered into the head IC 24 becomes dull, and this may lead to an increase of low-frequency signal component of the write data signal. The magnetic disk apparatus 10 performs write processing and read processing on the basis of a command from the host. Usual operation in the magnetic disk apparatus 10 will now be described. Upon receipt of the write command and write data from the host by the host interface control unit 34, the write command is decoded by the MPU 26, and the received write data is stored as required in the buffer memory 38. It is then converted into a prescribed data format by the formatting function of the hard disk controller 40, and an ECC code is added through an ECC processing. Then, after performing scrambling, RLL code conversion and further write compensation in the write modulating system of the read channel 42, the write data is supplied to the then selected, for example, write head element of the head 22-1, and written by the perpendicular magnetic recording process into the magnetic disk 20-1. At this point in time, a head positioning signal is given to the servo control unit 44, the head seeks a target track designated by the command by means of the voice coil motor 18, and then, it is put on track for tracking control. Upon receipt of the read command from the host by the host interface control unit 34, the read command is decoded by the MPU 26. After amplifying the read signal (read data signal) read out by, for example, the read head element of the head 22-1 selected by the head select of the head IC 24 through the preamplifier of the head IC 24, it is entered into the read demodulating system of the read channel 42. The read data is demodulated through virtual response maximum likelihood (PRML) detection or the like, and subjected to an ECC processing in the hard disk controller 40 to detect and correct an error. Thereafter, it is buffered to the buffer memory 38, and the read data is transferred from the host interface control unit 34 to the host.

Figure 2:
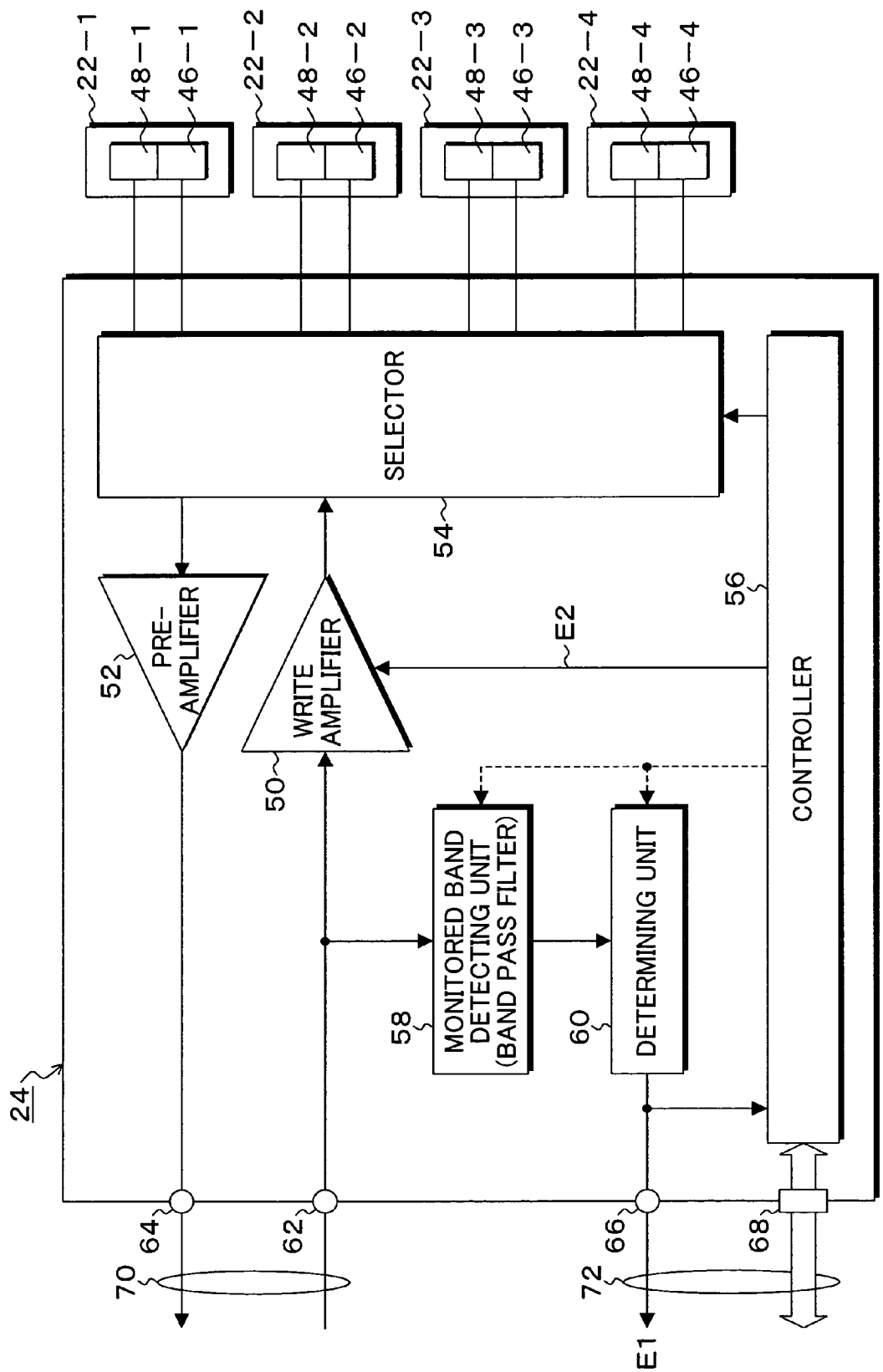
FIG. 2 is a circuit diagram illustrating an embodiment of the head IC shown in FIG. 1.

FIG. 2 is a circuit diagram illustrating an embodiment of the head IC 24 shown in FIG. 1. In FIG. 2, a write amplifier 50, a preamplifier 52, a selector 54, a controller 56, a monitored band detecting unit 58 using a band pass filter, and a determination unit 60 are provided in the head IC 24. The heads 22-1 to 22-4 are provided for the selector 54 and have write head elements 46-1 to 46-4 and read head elements 48-1 to 48-4, respectively. The write head elements 46-1 to 46-4 are single magnetic pole type recording heads each having read coils attached to a main magnetic pole and an auxiliary pole. The read head elements 48-1 to 48-4 have a head structure in which a GMR element is arranged between the auxiliary pole and the magnetic shield for each of the single magnetic pole type recording head. The selector selects any one of the signal lines to the heads 22-1 to 22-4 on the basis of the head select signal sent from the MPU 26 shown in FIG. 1 to the controller 56. When selecting, for example, the head 22-1, the write head element 46-1 is connected to the output of the write amplifier 50, and the read head element 48-1 is connected to the input of the preamplifier 52. For the write amplifier 50, when the write command from the host is decoded and the head is positioned at a target sector of a target track of the magnetic disk, the write data is entered from the read channel 42 shown in FIG. 1 into the write data input terminal 62. After amplification by the write amplifier 50, write current corresponding to the write data is supplied, for example, to the write head element 46-1 of the head 22-1 selected by the selector 54 to record the data by the perpendicular magnetic recording process onto the magnetic disk medium. In this embodiment, the monitored band detecting unit 58 and the determining unit 60 are provided for the write signal entered into the write amplifier 50. The monitored band detecting unit 58 sets a frequency band between the signal band of the write data and an error rate worsening band covering a lower range of frequency in which the error rate worsens as a monitored band, detects a signal in the monitored band among the write data signals, and outputs it to the determining unit 60. The determining unit 60 outputs a determination signal when determining a detection signal of the monitored band outputted from the monitored band detecting unit 58 is larger than a prescribed threshold value. This determination signal is a fault signal E1 outputted from a fault terminal 66 via the bus 28 shown in FIG. 1 to the MPU 26. The fault signal E1 from the determining unit 60 is also given to the controller 56. Upon receipt of the fault signal E1 from the determining unit 60, the controller 56 outputs a stop signal E2 to the write amplifier 50 to stop write operation carried out by the write amplifier 50.

Figure 3:
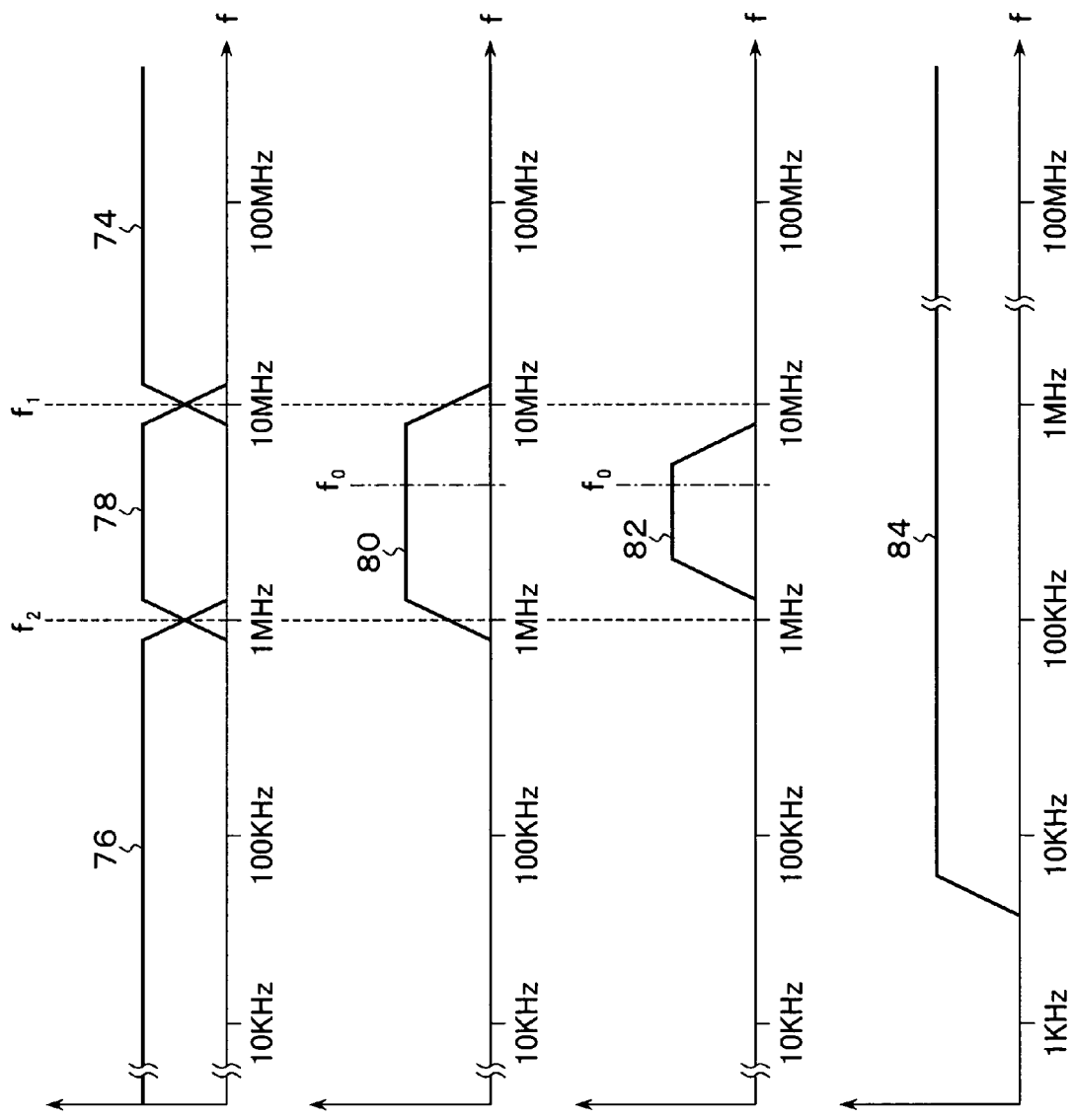
FIGS. 3A to 3D are descriptive views of the write data signal band, error rate band, monitored band, filter extraction band and read data signal band in the head IC shown in FIG. 2.

FIG. 3 is a descriptive view of the write data signal band, the error rate worsening band, the monitored band, the filter extraction band and the read data signal band in the head IC 24 shown in FIG. 2.

FIG. 3A illustrates the frequency relationship of the write data signal band 74, the error rate worsening band 76 and the monitored band 78 in this embodiment. The write data signal band 74 is a frequency band of write data signal entered from the read channel 42 into the write amplifier 50 of the head IC 24, which is dependent upon RRL conversion in the read channel 42. In this embodiment, the write data signal band 74 has a lower limit frequency f1 of, for example, f1=10 MHz, and a frequency band over f1=10 MHz forms the write data signal band 74. On the other hand, the error rate worsening band 76 is a region in which, in a state in which there is an increase in a low-region frequency component when the FPC line 25 connecting the head IC 24 shown in FIG. 1 to the read channel 42 is deformed by the move of the head caused by the voice soil motor 18, leading to the waveform becoming dull, worsening of the error rate during reproduction by the read head element is started upon writing the write data onto the magnetic disk.

Figure 4:
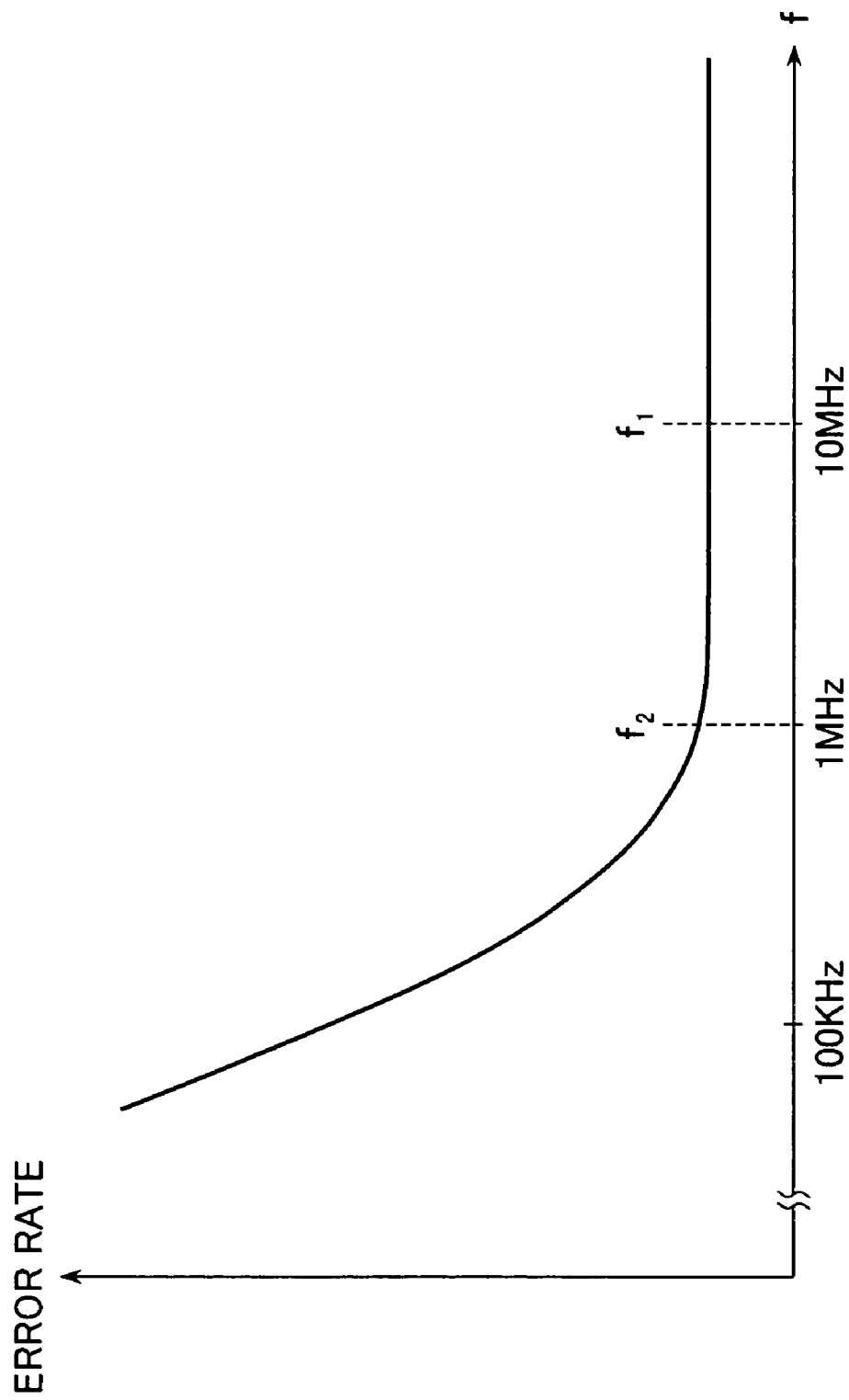
FIG. 4 is a characteristic diagram illustrating a change in error rate corresponding to an increase in low-frequency signal component of the write data signal in this embodiment.

FIG. 4 illustrates changes in the error rate during read when the write data signal band 74 expands onto the low-region side. A prescribed error rate is kept until the lower limit frequency f1 of the write data signal band 74 is reached. According as the change in waveform toward dullness causes an increase in low-frequency component, the error rate begins worsening when the frequency decreases over the level of 1 MHz, although the error rate is kept substantially constant until a frequency of about 1 MHz is reached. Such worsening of error rate caused by the low-range frequency component of the write data signal is brought about as follows. When the recording frequency of the write data signal expands onto the low-region side, the area of the DC recorded region on the magnetic disk recorded by the perpendicular magnetic recording process increases. As a result, leakage flux from the magnetic disk increases. This causes a shift of the operating point for maintaining symmetricity of amplitude of the MGR element used as a read head element relative to the magnetic flux from the normal operating point due to the leakage flux. This causes occurrence of asymmetricity in amplitude of the read signal, and this distortion of the read signal leads to worsening of the error rate of the read data.

Referring again to FIG. 3A, as compared with the lower limit frequency f1 of the write data signal band 74, the error rate worsening band 76 starts from an upper limit frequency f2 of about f2=1 MHz. There is thus a gap from the write data signal band 74. In this embodiment, therefore, an expansion of the write data signal frequency band into the error rate worsening band 76 prior thereto is detected to stop the write operation. The monitored band 78 is set between the write data signal band 74 and the error rate worsening band 76. The monitored band 78 is a frequency band from f1 to f2 between the lower limit frequency f1 of the write data signal band 74 and the upper limit frequency f2 of the error rate worsening band 76. In this embodiment, on the assumption of f1=10 MHz and f2=1 MHz, the monitored band would therefore be a vacant frequency band of about 9 MHz.

FIG. 3B illustrates a filter extraction band 80 achieved by the band pass filter provided in the monitored band detecting unit 58 shown in FIG. 2. In this embodiment, the same filter extraction band 80 as for the monitored band 78 set in FIG. 3A is set. More specifically, the monitored band 78 has a bandwidth of 9 MHz, with f2=1 MHz and f1=10 MHz. The band pass filter center frequency f0 is set at 5.5 MHz, half this bandwidth, and the band has a range of ±4.5 MHz relative to the center frequency f0.

FIG. 3C represents another example of the filter extraction band 82 in this embodiment. This filter extraction band 82 has a feature of being set within the monitored band 78 shown in FIG. 3A. For example, the center frequency f0 of the filter extraction band 82 has the same value of f0=5.5 MHz as in the case shown in FIG. 3B, and the band has a bandwidth of ±2 MHz relative to the center frequency f0. In FIGS. 3B and 3C, the center frequency f0 of the filter is set in the proximity of the center of the monitored band 78. A filter center frequency may however be set at an appropriate position within the range of the monitored band 78, and a positive or negative bandwidth may be appropriately set within a range not departing from the monitored band 78 relative to the center frequency.

FIG. 3D is a descriptive view of the read data signal band in this embodiment based on the perpendicular magnetic recording process. In a magnetic disk apparatus based on the perpendicular magnetic recording process, it is necessary, upon reading data, to read in a signal component of a low region such as several kHz as shown in the read data signal band 84. As compared with the write data signal band 74 shown in FIG. 3A, the read data signal band 84 exhibits a band property reaching a very low level.

Figure 5:
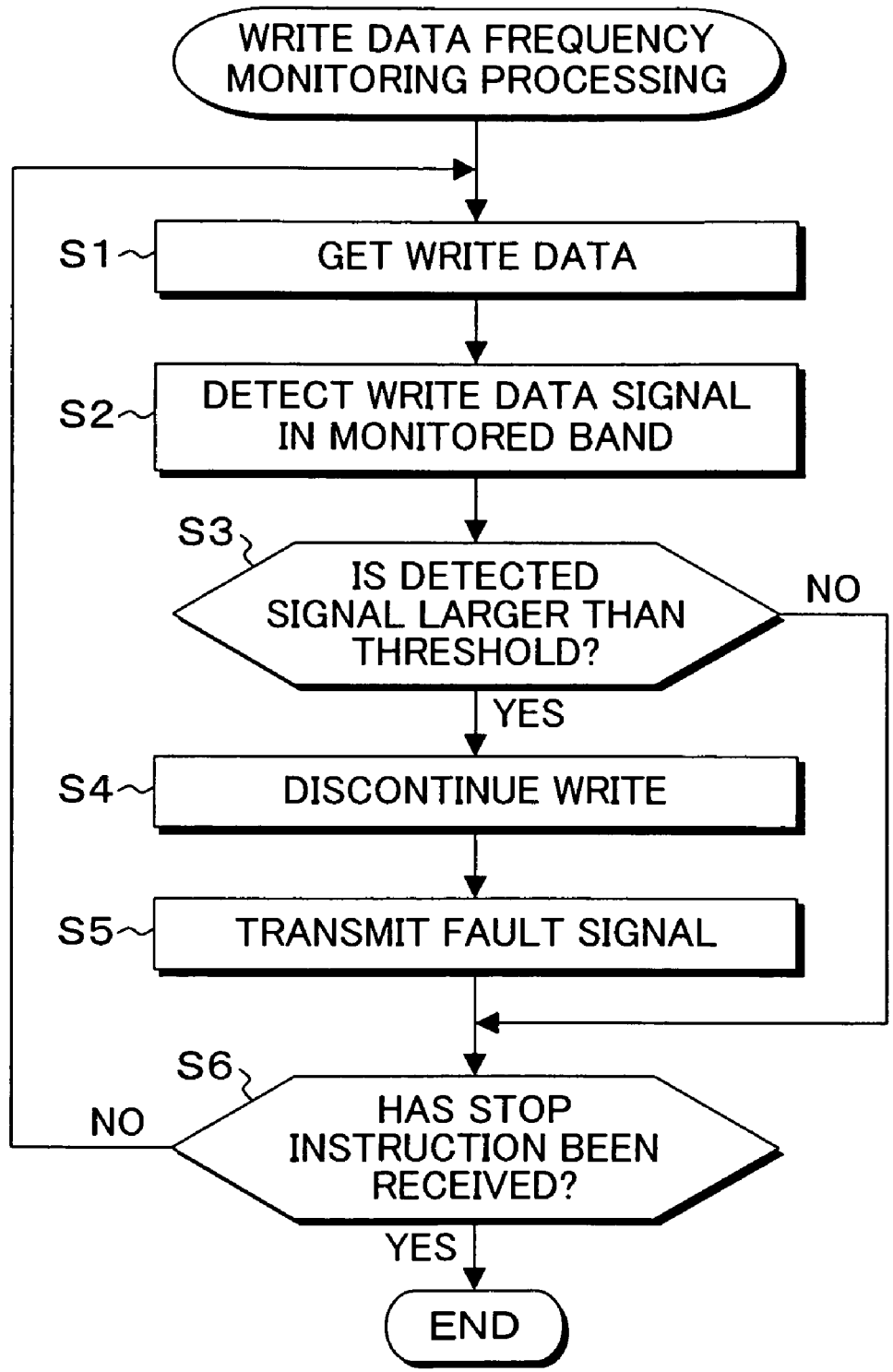
FIG. 5 is a flowchart of the write data frequency monitoring processing in the embodiment shown in FIG. 2.

FIG. 5 is a flowchart of the write data frequency monitoring processing in the embodiment shown in FIG. 2. This write data frequency monitoring processing is executed as a processing function applied by the controller 56 shown in FIG. 2. In FIG. 5, the controller 56 instructs acquisition of write data entered into the write amplifier 50 in step S1, validates the band pass filter of the monitored band detecting unit 58 in step S2, and detects a write data signal of the frequency band of the monitored band 78 shown in FIG. 3A. Then in step S3, it is checked by the determining unit 60 whether or not the detection signal is larger than the threshold value. If the detection signal is larger than the threshold value, a stop signal E2 is acquired for the write amplifier 50 in step S4 to discontinue writing. Then in step S5, a fault signal is transmitted from the fault terminal 66. The CPU 26 receives the fault signal, recognizes that the write stopping operation has been conducted at the head IC 24, and notifies the hard disk controller 40 and the read channel 42 of the write stop. As a result, the hard disk controller 40 recognizes a fault error of the write operation, and executes a retry after waiting for dissolution of the fault error. The processing operations in steps S1 to S5 are repeated until a stop instruction of the magnetic disk apparatus 10 is received in step S6.

Figure 6:
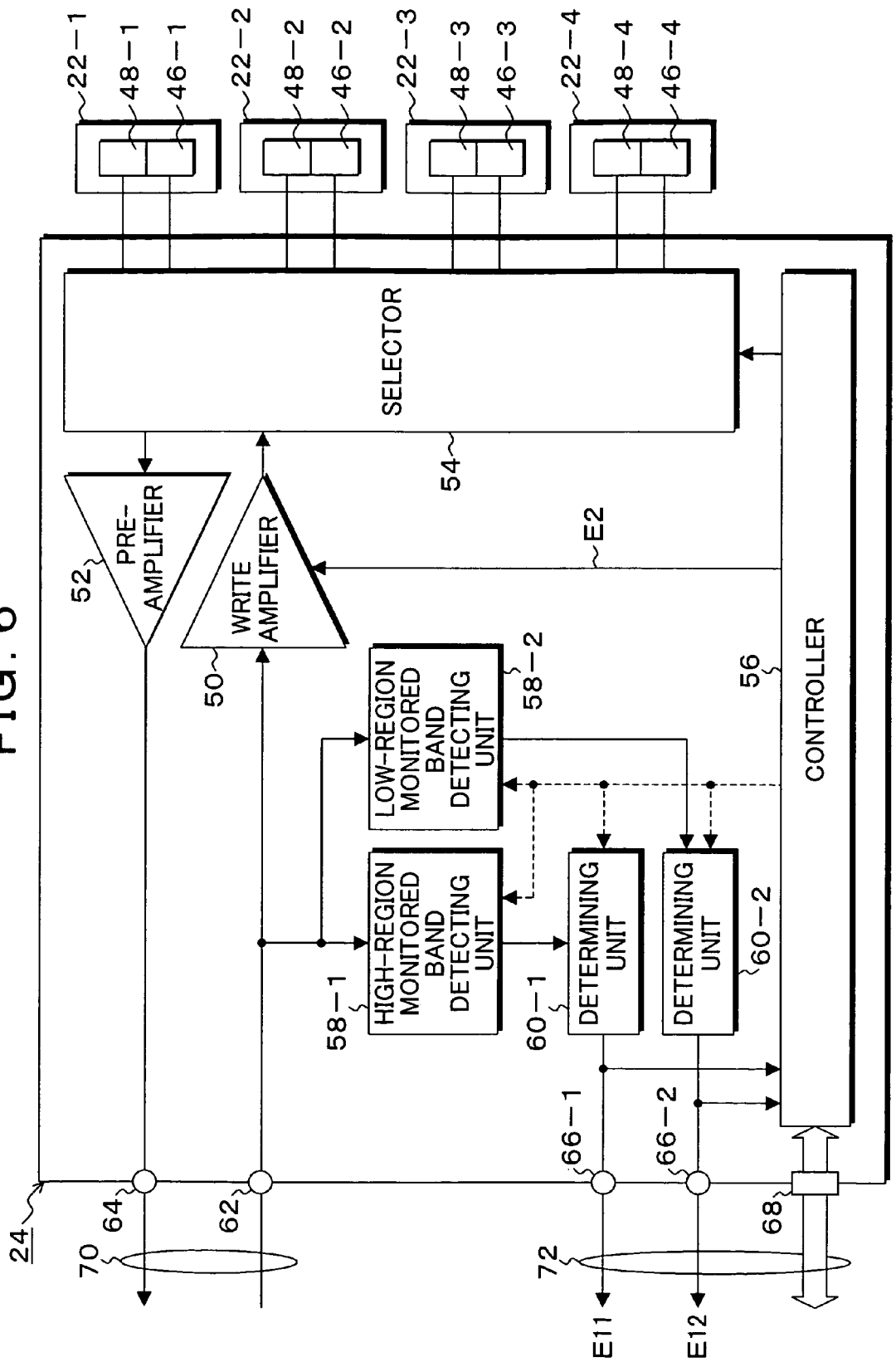
FIG. 6 is a circuit diagram illustrating another embodiment of the head IC shown in FIG. 1.

FIG. 6 is a circuit diagram illustrating another embodiment of the head IC 24 shown in FIG. 1. The embodiment shown in FIG. 6 is characterized in that frequency monitoring of the write data signal is accomplished in two stages. For this purpose, a high-region monitored band detecting unit 58-1 and low-region monitored band detecting unit 58-2 are provided for the write data signal, with corresponding determining unit for high region 60-1 and determining unit for low region 60-2. Determination signals E11 and E12 from the determining units 60-2 are entered into the controller 56 and outputted onto the MPU 26 side shown in FIG. 1 via fault terminals 66-1 and 66-2. The controller 56 controls operating timing of the high-region monitored band detecting unit 58-1, the low-region monitored band detecting unit 58-2, and the determining units 60-1 and 60-2 and conducts write stop by outputting a stop signal E2 to the write amplifier 50 on the basis of determination signals E11 and E12 of the determining units 60-1 and 60-2. A write amplifier 50, a preamplifier 52 and a selector 54 are configured as in the embodiment shown in FIG. 2.

FIGS. 7A to 7C is a descriptive view of the write data signal band, the monitored band and the filter extraction band in the embodiment shown in FIG. 6. FIG. 7A illustrates the write data signal band 74, the error rate worsening band 76 and the monitored band 78, as in FIG. 3A.

On the other hand, FIG. 7B illustrates a filter extraction band 80-1 based on the band pass filter provided in the high-range monitored band detecting unit 58-1 shown in FIG. 6 and a filter band property 80-2 based on the band pass filter provided in the low-region monitored band detecting unit 58-2, which monitor an increase in the low-region frequency component of the write data signal by dividing the monitored band 78 into two regions including high and low regions. For example, the monitored band 78 is a band of 9 MHz having a lower limit frequency of f2=1 MHz and an upper limit frequency of f1=10 MHz. The monitored band 78 is therefore divided into two including a high region side from 5.5 to 9 MHz and a low region side from 1 to 5.5 MHz. Two stages are provided with filter extraction bands 80-1 and 80-2 having a bandwidth of ±2.25 MHz by setting band pass filter center frequencies f01=3.25 MHz and f02=7.75 MHz, thereby detecting an increase in low-frequency signal component contained in the write data signal.

FIG. 7C illustrates another high-region monitored band and low-region monitored band divided into two stages for monitoring an increase in low-frequency component of the write data signal. For the high region in this case, a high-region monitored band 80-11 is set in correspondence to the monitored band 78. A low-region monitored band 80-12 is however set in the error rate worsening band 76 adjacent to the low region side of the monitored band 78, not in the monitored band 78. When the detection signal of the write data signal derived from the high-region monitored band 80-1 or 80-11 in FIG. 7B or 7C is larger than the threshold value, the determining unit 60-1 shown in FIG. 6 outputs a first fault signal (first determination signal) for generating a fault event. The first fault signal 11 is sent from the fault terminal 66-1 to the MPU 26 shown in FIG. 1 and generates a fault event. Thereafter, when the detection signal of the low-region monitored band 80-2 or 80-12 is larger than the threshold value at the determining unit 60-2, a second fault signal (second determination signal) for stopping the write operation is outputted. The second fault signal is outputted from the fault terminal 66-2 to the MPU 26 shown in FIG. 1. Simultaneously, write is discontinued by the controller 56 by outputting a stop signal E2 to the write amplifier 50 as the second fault signal is outputted to the controller 56. Upon receipt of the second fault signal E12 from the head IC 24, the MPU 26 recognizes that write is discontinued as a result of an increase in low-frequency component of the write data signal at the head IC 24, causes the hard disk controller 40 and the read channel 42 side to perform retry operation, after waiting for recovery of the fault error of the head IC 24.

Figure 8:
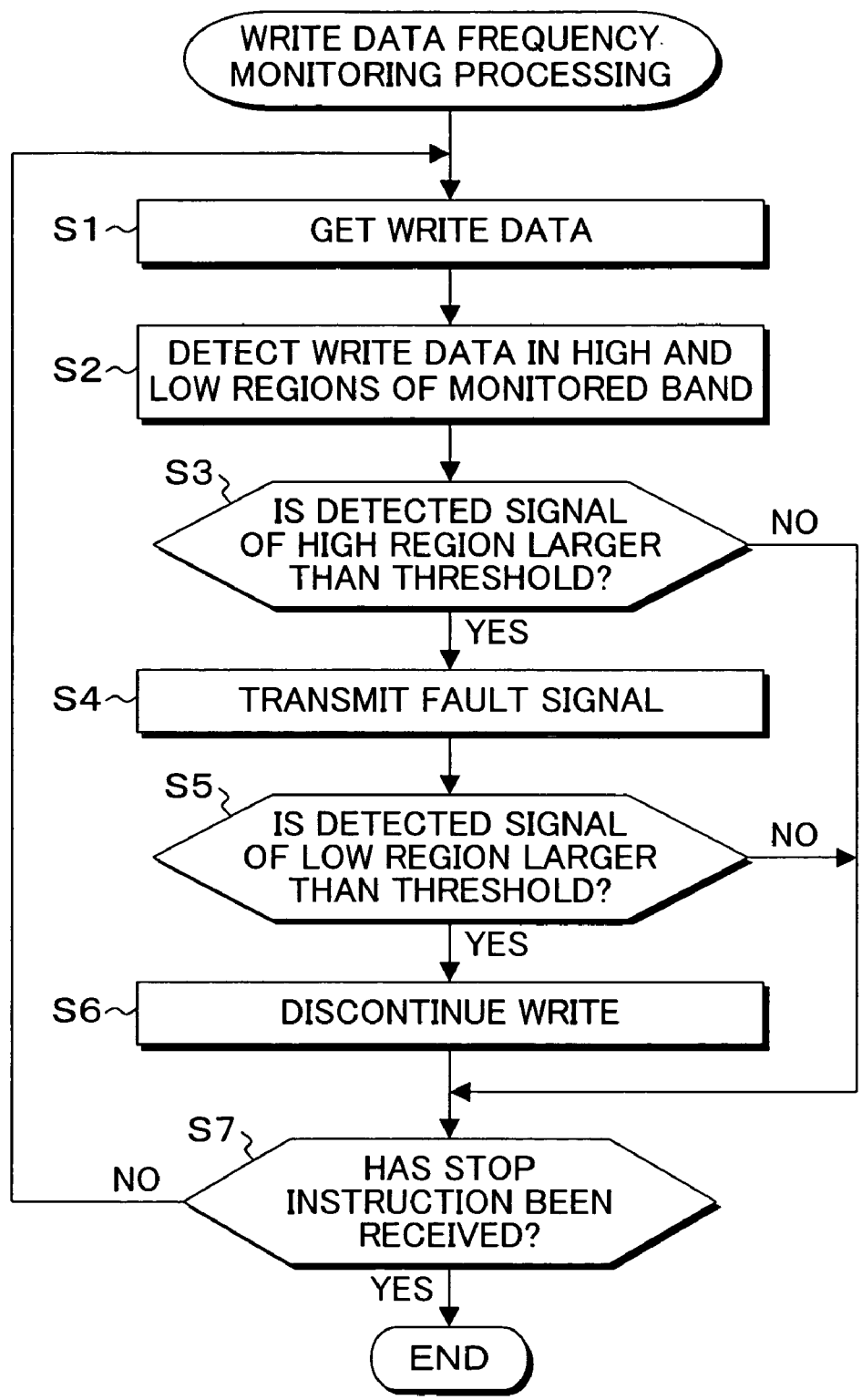
FIG. 8 is a flowchart of the write data frequency monitoring processing in the embodiment shown in FIG. 6.

FIG. 8 is a flowchart of write data frequency monitoring processing in this embodiment shown in FIG. 6. In FIG. 8, the controller 56 gets write data for the write amplifier 50 in step S1, and in step S2, write data signals in the filter extraction bands 80-1 and 80-2 corresponding, for example, to the monitored band 78 of FIG. 7B are detected. Then, upon determination that the detection signal of the high-region write data signal is larger than the threshold value in step S3, the first fault signal is transmitted to generate a fault event in step S4. When the low-region write data detection signal is determined to be larger than the threshold value in step S5, the second fault signal is outputted. The controller 56 stops write operation into the write amplifier 50 in step S6. At the same time, write stop is notified by outputting the second fault signal to the CPU 26 side to cause retry operation after waiting for recovery of the fault error. The processing in steps S1 to S6 is repeated until a stop instruction resulting from shutdown of power of the magnetic disk apparatus is received in step S7. The above-mentioned embodiments have presented a case of the write data frequency monitoring processing of which the flowchart is shown in FIG. 5 or FIG. 8 by the firmware function of the controller 56 provided in the head IC 24 of FIG. 2 or 6. The function of the head IC 24 may be implemented all in hardware without depending upon the firmware function of the controller 56. The relationship of the write data signal band 74, the error rate worsening band 76 and the monitored band 78 provided therebetween shown in the above-mentioned embodiment is relatively determined by the configuration of the magnetic disk apparatus based on the perpendicular magnetic recording process to which this embodiment is applied, and the values of frequency representing the individual bands shown in the above-mentioned embodiment are only examples. What is important in this embodiment is, for example as shown in FIG. 3A, that there is a difference between the lower limit frequency f1 of the write data signal band 74 and the upper limit frequency f2 of the error rate worsening band 76. In view of this difference, a monitored band 78 is set between the write data signal band 74 and the error rate worsening band 76 to detected an increase in low-frequency component resulting from dullness of the waveform of the write data signal in this monitored band and to permit conducting write stop by the head IC 24 itself.

This embodiment includes appropriate variations without impairing the object and advantages thereof, and is not limited by the numerical values shown in the above-mentioned embodiment.

The features of the present invention will now be described in the following notes.

What is claimed is:

1. A storage apparatus comprising:
    a head having a write head element which records data onto a disk medium and a read head element which reproduces data from said disk medium, said disk medium configured for perpendicular magnetic recording;
    a write amplifier which outputs write data signals to said write head element;
    a monitored band detecting unit which sets a frequency band between a signal band of said write data signals and an error rate worsening band in which the error rate worsens as a monitored band, said error rate worsening band being lower in frequency than said signal band of said write data signal, and detects signals falling within said monitored band from among write data signals entered into said write amplifier; and
    a determining unit which determines whether or not a signal detected in the monitored band by said monitored band detecting unit is larger than a prescribed threshold value and outputs a determination signal, wherein said determining unit discontinues recording operation of said write amplifier and causes generation of a fault event by outputting said determination signal.

2. A storage apparatus according to claim 1, wherein the monitored band set in said monitored band detecting unit is a band covering a range from a lower limit frequency of said write data signal band to the upper limit frequency of said error rate worsening band which is lower than said lower limit of the write data signal band.

3. The storage apparatus according to claim 1, wherein said monitored band detecting unit has a band pass filter; an arbitrary frequency within said monitored band is set as a center frequency of said band pass filter; and the bandwidth of said band pass filter is set at a bandwidth not exceeding said monitored band.

4. The storage apparatus according to claim 1, wherein said monitored band detecting unit has a band pass filter; a frequency at about the center of said monitored band is set as a center frequency of said band pass filter; and the bandwidth of said band pass filter is set within ½ the bandwidth of said monitored band.

5. The storage apparatus according to claim 1, wherein:
said monitored band detecting unit detects, by dividing said monitored band into a high-region monitored band and a low-region monitored band, a signal of each monitored band; and
said determining unit causes, upon determining that the detection signal of said high-region monitored band is larger than a prescribed threshold value, generation of a fault event by outputting a first determination signal, and when the determination signal of said low-region monitored band is determined to be larger than a prescribed threshold value, discontinues recording operation of said write amplifier by outputting a second determination signal.

6. The storage apparatus according to claim 1, wherein:
there is provided a worsening band monitoring unit which detects a signal of said error rate worsening band; and
said determining unit causes, upon determining that the detection signal of said monitored band is larger than a prescribed threshold value, generation of a fault event by outputting a first determination signal, and when the determination signal of said error rate worsening band is determined to be larger than a prescribed threshold value, discontinues recording operation of said write amplifier by outputting a second determination signal.

7. The storage apparatus according to claim 1, wherein said write amplifier, monitored band detecting unit and determining unit form an integrated circuit integrated together with a read amplifier which preliminarily amplifies and outputs a signal read out from said read head, and said integrated circuit has at least an input/output terminal of said write amplifier, an input/output terminal of said read amplifier, and a determination signal output terminal of said determining unit.

8. A control method of a storage apparatus which comprises:
a head having a write head element recording data onto a disk medium and a read head element reproducing data from said disk medium, said disk medium configured for perpendicular magnetic recording; and
a write amplifier outputting a write data signal to said write head element;
said control method comprising:
a monitored band detecting step of setting a frequency band between a signal band of said write data signal and an error rate worsening band in which the error rate worsens for the monitored band, said error rate worsening band being lower in frequency than said signal band of said write data signal, and detecting a signal in said monitored band in the write data signals entered into said write amplifier; and
a determining step of determining that a detection signal of the monitored band by said monitored band detecting step is larger than a prescribed threshold value and outputting a determination signals,
wherein said determining step stops recording operation of said write amplifier and causes generation of a fault event by outputting said determination signal.

9. The control method of a storage apparatus according to claim 8, wherein said monitored band covers a range from the lower limit frequency of said write data signal band to the upper limit frequency of said error rate worsening band lower than said lower limit of the write data signal band.

10. The control method of a storage apparatus according to claim 8, wherein:
said monitored band detecting unit detects, by dividing said monitored band into a high-region monitored band and a low-region monitored band, a signal of each monitored band; and
said determining step causes, upon determining that the detection signal of said high-region monitored band is larger than a prescribed threshold value, generation of a fault event by outputting a first determination signal, and when the determination signal of said low-region monitored band is determined to be larger than a prescribed threshold value, discontinues recording operation of said write amplifier by outputting a second determination signal.

11. The control method of a storage apparatus according to claim 8, wherein:
there is provided a worsening band monitoring step of detecting a signal of said error rate worsening band; and
said determining step causes, upon determining that the detection signal of said monitored band is larger than a prescribed threshold value, generation of a fault event by outputting a first determination signal, and when the detection signal of said error rate worsening band is determined to be larger than a prescribed threshold value, discontinues recording operation of said write amplifier by outputting a second determination signal.

12. A control apparatus comprising:
a write amplifier which outputs a write data signal to a write head element;
a monitored band detecting unit which sets a frequency band between a signal band of said write data signal and an error rate worsening band lower in which the error rate worsens as a monitored band, said error rate worsening band being lower in frequency than said signal band of said write data signal, and detects a signal of said monitored band from among write data signals entered into said write amplifier; and
a determining unit which determines that a detection signal of a monitored band by said monitored band detecting unit is larger than a prescribed threshold value and outputs a determination signals,
wherein said determining unit discontinues the recording operation of said write amplifier and causes generation of a fault event by outputting said determination signal.

13. The control apparatus according to claim 12, wherein the monitored band set by said monitored band detecting unit covers a range from the lower limit frequency of said write data signal band to the upper limit frequency of said error rate worsening band lower than said lower limit of the write data signal band.

14. The control apparatus according to claim 12, wherein said monitored band detecting unit has a band pass filter; said band pass filter sets an arbitrary frequency within said monitored band as a center frequency thereof; and sets a bandwidth not exceeding said monitored band as the bandwidth of said band pass filter.

15. The control apparatus according to claim 12, wherein said monitored band detecting unit has a band pass filter; and said band pass filter sets a center frequency at about the center of said monitored band, within a range of ½ the bandwidth of said monitored band as a bandwidth of said band pass filter.

16. The control apparatus according to claim 12, wherein:
said monitored band detecting unit divides said monitored band into a high-region monitored band and a low-region monitored band, and detects a signal of each monitored band; and
said determining unit outputs, when a detection signal of said high-region monitored band is determined to be larger than a prescribed threshold value, a first determination signal to generate a fault event, and when a detection signal of said low-region monitored band is determined to be larger than a prescribed threshold value, discontinues the recording operation of said write amplifier by outputting a second determination signal.

17. The control apparatus according to claim 12, wherein:
there is provided a worsening band monitoring unit which detects a signal of said error rate worsening band; and
said determining unit generates, when a detection signal of said monitored band is determined to be larger than a prescribed threshold value, a fault event by outputting a first determination signal, and when a determination signal of said error worsening band is determined to be larger than a prescribed threshold value, discontinues the recording operation of said write amplifier by outputting a second determination signal.

\* \* \* \* \*